United States Patent [19]
Jackson

[11] Patent Number: 5,825,674
[45] Date of Patent: Oct. 20, 1998

[54] POWER CONTROL FOR MOBILE ELECTRONICS USING NO-OPERATION INSTRUCTIONS

[75] Inventor: Robert T. Jackson, San Jose, Calif.

[73] Assignee: Intel Corporation, Santa Clara, Calif.

[21] Appl. No.: 563,493

[22] Filed: Nov. 28, 1995

Related U.S. Application Data

[63] Continuation-in-part of Ser. No. 537,146, Sep. 29, 1995.

[51] Int. Cl.⁶ ...................................................... H02J 3/16
[52] U.S. Cl. .................................... 364/707; 395/200.18
[58] Field of Search .................................... 364/492, 707; 395/750, 200.18, 882; 375/121

[56] References Cited

U.S. PATENT DOCUMENTS

| | | |
|---|---|---|
| 4,238,784 | 12/1980 | Keen et al. . |
| 5,254,992 | 10/1993 | Keen et al. . |
| 5,369,771 | 11/1994 | Gettel ........................................ 395/750 |
| 5,392,437 | 2/1995 | Matter et al. ........................... 395/750 |
| 5,410,682 | 4/1995 | Sites et al. ............................... 395/800 |
| 5,546,568 | 8/1996 | Bland et al. ............................. 395/550 |
| 5,560,024 | 9/1996 | Harper et al. ........................... 395/750 |

*Primary Examiner*—James P. Trammell
*Assistant Examiner*—Thomas Peeso
*Attorney, Agent, or Firm*—Blakely, Sokoloff, Taylor & Zafman

[57] ABSTRACT

A system for regulating power in a mobile electronics device uses "hint" NOP instructions having a reserved field of bits that generate control signals to affect an increase or decrease in power dissipation. The control signals raise or lower the operating potential provided by a power supply and also adjust the frequency of a clock signal in accordance with the information provided by the NOP instruction. Power is reduced for code sequences that could be executed more slowly, or the device is otherwise idle, without affecting the user's perception of overall system performance.

20 Claims, 5 Drawing Sheets

FIG_1 (PRIOR ART)

FIG_2A

FIG_2B

FIG_3

FIG_4

FIG_5

FIG_6

FIG_7

POWER CONTROL FOR MOBILE ELECTRONICS USING NO-OPERATION INSTRUCTIONS

RELATED APPLICATIONS

This is a continuation-in-part application of Ser. No. 08/537,146, filed Sep. 29, 1995, which is assigned to the assignee of the present application.

FIELD OF THE INVENTION

The present invention relates to the field of electronic devices. More particularly, the present invention relates to methods and apparatus for controlling power consumption by an electronic device through voltage and frequency scaling.

BACKGROUND OF THE INVENTION

Over the last few years, there have been many advances in semiconductor technology which have resulted in the development of improved electronic devices having integrated circuits operating at higher frequencies and supporting additional and/or enhanced features. While these advances have enabled hardware manufacturers to design and build faster and more sophisticated hardware products (e.g., computers, peripheral devices, etc.), they have also imposed a disadvantage primarily experienced by battery-powered laptop or notebook style computers. In particular, these improved electronic devices consume more power and dissipate more heat as a by-product than those past generation electronic devices.

It is well known that modern battery-powered laptop computers place a high premium on reducing power consumption to control component overheating and because such reduction extends its battery life. Currently, one primary technique to reduce power consumption of laptop computers is to lower the frequency of the clocking signal supplied to one of its electronic devices, namely its central processing unit ("CPU"). This technique (referred to herein as "frequency reduction") usually is accomplished by straightforward frequency reduction of the clocking signal supplied to the CPU (i.e., the CPU clock) or, in the alternative, halting the clocking signal for brief time intervals so that the average operating frequency is reduced.

An alternative approach disclosed in U.S. Pat. No. 5,392,437 involves clocking multiple functional units of an integrated circuit independently. When a particular functional unit is not in use, it is effectively powered down by disabling the associated clock signal.

Figure 1:
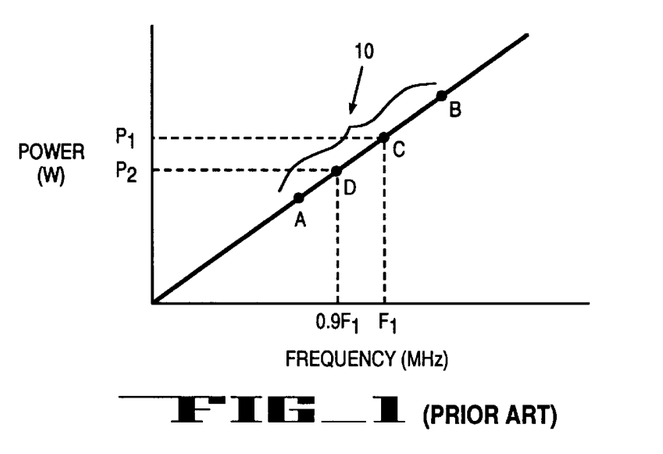
FIG. 1 is an illustrative diagram of theoretical power savings realized by a conventional frequency reduction technique.

Referring to FIG. 1, a graph illustrating power savings realized by a typical complementary metal-oxide semiconductor (CMOS) electronic device based on the conventional frequency reduction technique is shown. It is well-known that electronic devices, in general, are designed to operate within a specific frequency range. This frequency range 10 is represented as being between points A and B, where point A represents the minimum frequency required for the electronic device to operate and point B represents the maximum frequency that the electronic device can support. In theory, power is directly proportional to frequency as presented herein. Thus, as shown through points C and D, a reduction in the operating frequency of the electronic device by ten percent (10%) will reduce its total power consumption by ten percent (10%) from P1 to P2. Of course, true system power savings are not exactly proportional to frequency reduction because most every hardware product is implemented with some non-CMOS electronic devices which consume power but are frequency-independent (e.g., displays for computer systems).

This conventional frequency reduction technique imposes a number of disadvantages. One paramount disadvantage is that the frequency reduction offers minimal conservation of battery life because the amount of energy required by the electronic device undergoing frequency reduction to perform a certain task can remain constant. In some situations, depending on the chosen configuration between frequency-dependent and frequency independent devices within a product like a laptop computer, frequency reduction may adversely effect battery life conservation. This is largely due to the fact that the electronic device, while operating at a slower frequency, requires extra operating time to complete the task. As a result, this extra operating time causes the frequency-independent devices within the product to consume more energy which, in some cases, will exceed any energy savings realized by reduced the operating frequency of the electronic device.

Hence, it is desirous to create a power control circuit and develop a technique for reducing power consumption which can be utilized by any type of electronic device—especially mobile electronics devices—to more effectively control power consumption without substantially mitigating performance.

Once hardware capability for controlling power consumption has been made available, another problem arises; namely, how to invoke such control in a simple, reliable manner. Although the use of thermal sensors for detecting excessive power consumption is well-known in the electronics arts, these circuits lack intelligence and cannot respond to different software execution speed requirements. That is, they are sensitive only to one physical parameter (e.g., temperature) and are generally non-responsive to changes in operating system (OS) or applications program (AP) software routines. For instance, whereas certain portions of code are optimally executed as fast as possible to maximize performance, other portions may be executed at a much slower rate, thereby conserving power. Ideally, it is desirable to have the ability to dynamically control power consumption in a mobile electronic device—increasing or decreasing power based on the demands of currently executing software—so as to extend battery life without compromising system performance.

Power management software programs that attempt to detect an "idle" central processing unit (CPU) currently exist. However, such programs are not always effective and lack the ability to discriminate between different types of software code. For example, there are certain software routines or applications that may be run at a relatively slow speed without adversely affecting the user's perception of performance. These typically go undetected by existing power management software programs. Yet, it is precisely these situations that afford the opportunity for significant power savings. In a mobile environment, for example, such savings would greatly extend battery life, and hence, the usefulness of the electronics device.

As will be seen, the present invention provides a simple, elegant way to control power in a mobile electronics environment. The invention allows operating system or application program software to increase or decrease power by including a special "no-operation" (NOP) instruction in the normal program flow. A reserved field of the NOP instruction provides "hint" information that is used to generate logic signals which either raise or lower power for subsequent portions of code (i.e., code following the NOP instruction).

By way of further background, Applicant wishes to bring the reader's attention to U.S. Pat. No. 5,410,682, which discloses a CPU that provides branch prediction hints. Also, application Ser. No. 08/530,614, filed Sep. 19, 1995, which is assigned to the assignee of the present application, discloses a method of modifying an instruction set architecture while maintaining backward compatibility.

SUMMARY OF THE INVENTION

The present invention overcomes the problems of the prior art by providing a system for regulating power in a mobile electronics device by the use of "hint" NOP instructions. The hint HOP instructions are inserted into a software program, such as an operating system or applications program, which is executed on a microprocessor. The NOP instruction includes an opcode field and a reserved field of bits that, when executed, provide information to a logic circuit which generates control signals that affect an increase or decrease in power for the mobile electronic device. The control signals raise or lower the operating potential provided by a power supply and also adjust the frequency of a clock signal in accordance with the information provided by the NOP instruction. In this way, the rate at which the processor (and the mobile electronic device) operates may be precisely controlled by software such that power is reduced for code sequences that can be executed more slowly without affecting the user's perception of system performance.

BRIEF DESCRIPTION OF THE DRAWINGS

The features and advantages of the present invention will become apparent from the following detailed description of the present invention in which.

DETAILED DESCRIPTION

The present invention describes a system and method for controlling power consumption of a mobile electronic device through both voltage and frequency scaling. The following description is presented largely in terms of graphs, block diagrams and a flowchart which collectively illustrate the present invention in detail but does not discuss well-known circuits or process steps to avoid unnecessarily obscuring the present invention. The flowchart illustrates a series of steps leading to a desired result. These steps require physical manipulations of physical quantities in the form of electrical or magnetic signals capable of being stored, transferred, combined, compared or otherwise manipulated.

Figure 2A:
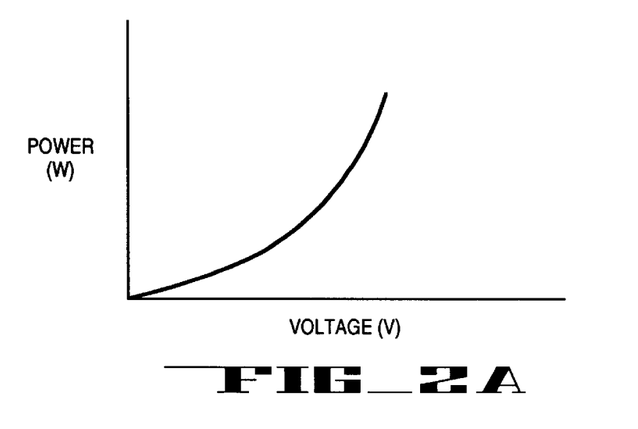
FIG. 2a is an illustrative diagram of the theoretical "squared" relationship between voltage and power.

Referring to FIG. 2a, an illustrative graph of the relationship between voltage and power is shown. As shown by the equation below (which is valid for many electronic devices, such as CMOS devices) power has a "squared" law dependence with voltage which, in turn, has a generally proportional relationship with the operating frequency.

$$Power = C \times V^2 \times F \times (\%Act)$$

where

C=total capacitance of the electronic device;

V=total voltage supplied to the electronic device;

F=operating frequency of the electronic device; and

%Act=percentage of gates of the electronic devices changing state in a given clock cycle.

Note that the maximum operating frequency is approximately proportional to V in the range $V_1 \geq V \geq V_2$, where $V_1$ is the maximum operating voltage supported by the electronic device.

Thus, according to the above equation, a ten percent decrease (10%) in voltage results in about a nineteen percent (19%) decrease in power, since $C \times (0.90\ V)^2 \times F \times Act = (0.81) \times Power$.

Figure 2B:
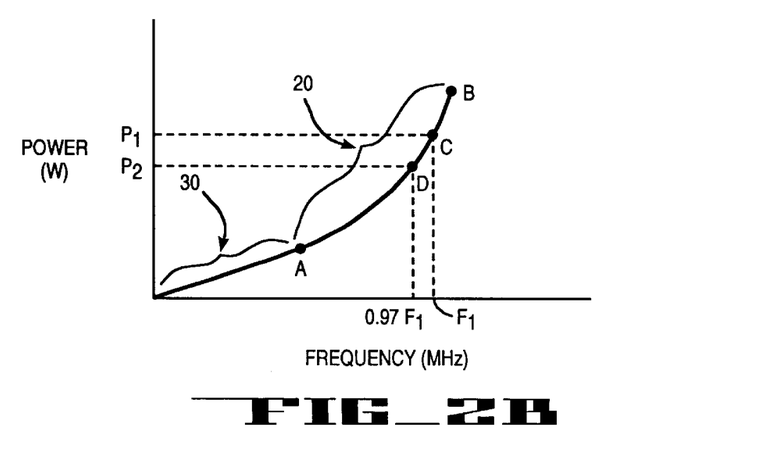
FIG. 2b is an illustrative diagram of power savings realized by an electronic device which is controlled through voltage and frequency scaling in accordance with the present invention.

Referring now to FIG. 2b, an illustrative graph of the power saving realized by an electronic device by performing combined voltage and frequency scaling is shown. Similar to FIG. 1, the electronic device is operational within a voltage range 20 which is defined between point "A" (minimum operating voltage of the electronic device) and point "B" (maximum operating voltage). Furthermore, to be consistent with FIG. 1, points "C" and "D" represent the operational frequency of the electronic device at power levels $P_1$ and $P_2$ ($P_2=0.9P_1$), respectively. Thus, in the present invention, by decreasing the operational frequency and voltage of the electronic device (at point "C") by slightly more than three percent (to point "D"), the power consumed by the electronic device is decreased by approximately ten percent, since $$C \times (0.966\ V)^2 \times (0.966\ F) \times (\%Act) = (0.901) \times Power$$

While the realized power savings is generally equivalent to that obtained through the conventional frequency reduction technique, the operating frequency of the electronic device is diminished by only 3%, as opposed to 10%. It is contemplated that voltage and frequency scaling may occur in the voltage range 20, however only frequency scaling may occur for the electronic device along a low-voltage range 30 up to point "A". The reason for this is because voltage scaling in the low-voltage range 30 would cause the electronic device to become inoperative.

Figure 3:
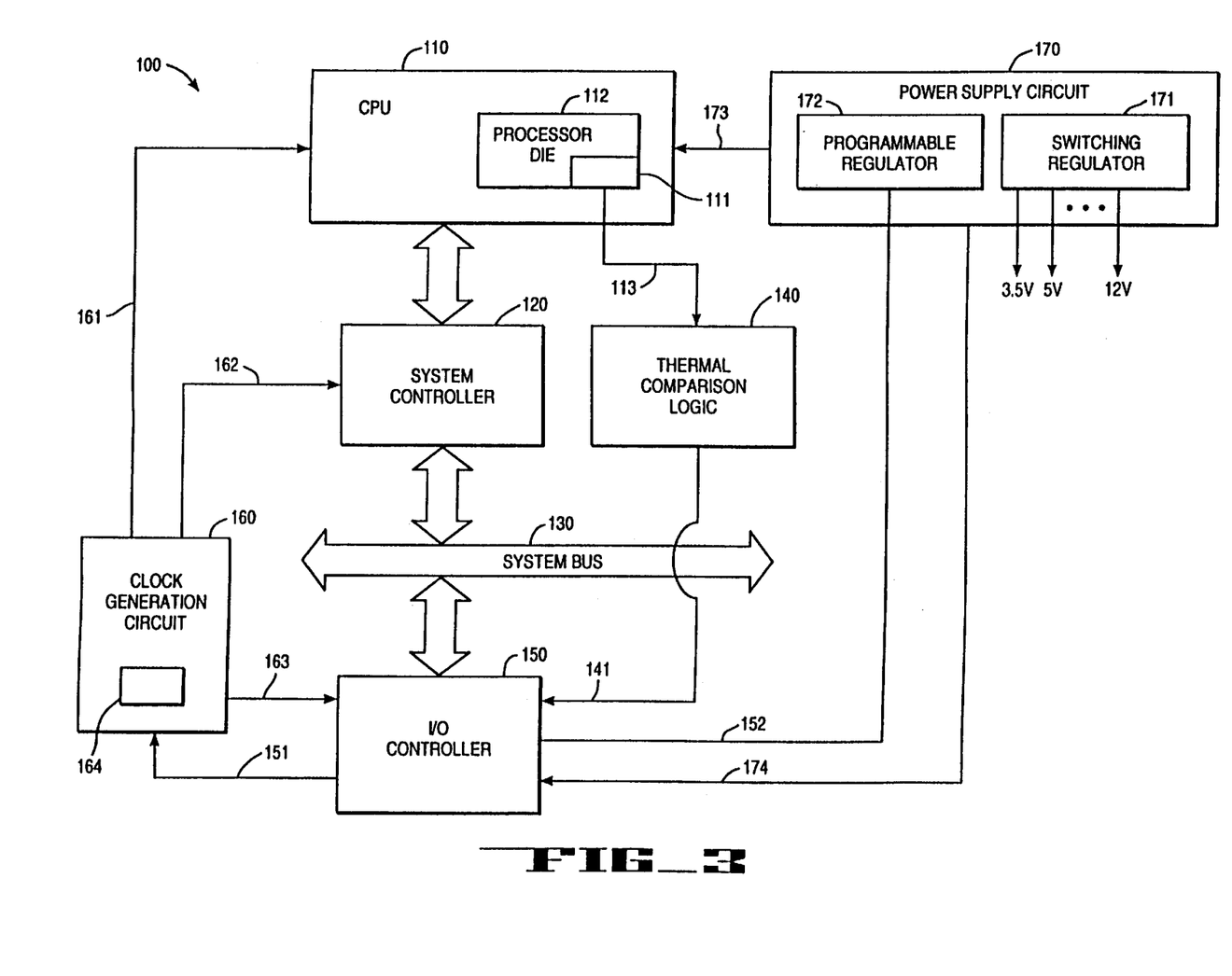
FIG. 3 is an illustrative block diagram of a power control circuit utilized in conjunction with the present invention.

Referring to FIG. 3, one embodiment of a power control circuit employed within a computer system to control power consumption by an electronic device (e.g., a microprocessor) is illustrated. Although the electronic device is shown as a microprocessor because of its reputation of being one of the main power consuming chips within a computer system, the power control circuit is capable of controlling power consumption by other types of electronic devices such as controllers.

The computer system 100 comprises a central processing unit ("CPU") 110, a system controller 120, a system bus 130, thermal comparison logic 140, an input/output ("I/O") controller 150, a clock generation circuit 160 and a power supply circuit 170. After the computer system is powered-on and the user has selected a software application from main memory, mass storage memory device (e.g., IDE device) or an external disk drive to perform a certain task, the I/O controller 150 is configured by thermal management software stored within the CPU 110 to facilitate voltage and frequency scaling of the CPU 110 if at least one of two conditions occurs; namely, the temperature of the CPU 110 exceeds a thermal band or the CPU 110 is experiencing excessive idle time. As will be discussed in more detail shortly, the present invention provides an additional mechanism of control, namely, direct software control.

The "thermal band" is represented by an absolute hardware limit (requiring immediate device shut-off if exceeded) and programmable software upper and lower limits. These software limits represent thermal limits where, if exceeded, "throttling" (i.e., decreasingly scale voltage and frequency) or "dethrottling" is recommended.

As shown, a temperature sensing component (e.g., thermistor and the like) 111 is coupled to a processor die 112 of the CPU 110 in order to monitor the temperature of the processor die 112 through thermal dissipation results, and to detect when the temperature has exceeded the thermal band. Thereafter, the temperature sensing component 111 transmits an analog or digital signal to the thermal comparison logic 140 via control line 113. The thermal comparison logic 140 receives the signal. If the signal is analog, the thermal comparison logic converts it into a digital signal. The digital signal is input into the I/O controller 150 via a temperature control line 141. This digital signal, when asserted, indicates to the I/O controller 150 that the CPU 110 is operating at a temperature outside its thermal band. As a result, the I/O controller 150 needs to perform an operation to reduce the temperature of the processor die 112 within the CPU 110.

To reduce the temperature of the processor die 112, the I/O controller 150 programs a register 164 within the clock generation circuit 160 by propagating user-configured, programmable information stored within the I/O controller 150 into the register 164 via control line 151. The programmed information indicates how much (usually in a percentage value) the operating frequency of the clocking signal, supplied to at least the CPU 110 by the clock generation circuit 160 via clock lines 161, is to be altered. In some CPU implementations as shown, the clocking signal utilized by the system bus 130 must bear a fixed relationship with the clocking signal input into the CPU 110 (i.e., CPU clock).

As a result, the clocking signals of the system controller 120 and the system bus 130 are reduced in proportion to the CPU clock. The clock generation circuit 160 monitors the value of the register 164 and appropriately modifies the frequency of the clocking signals transferred through clock lines 161–163. It should be understood that the clock generator is designed such that the rate at which frequency is changed is sufficiently slow so that all of the phase-locked loops (PLLs) in the system remain locked.

After determining that the operating frequency has been reduced though any well known technique (e.g., signaling, preset delay time, etc.), the I/O controller 150 generates a voltage modification control signal to the power supply circuit 170 via control line 152. The power supply circuit 170 includes a switching regulator 171 and a programmable regulator 172. Although not shown, the power supply circuit 170 includes a sensing circuit to indicate to the I/O controller 150 whether power is provided to the computer system 100 from a wall socket or from a battery source. The programmable regulator 172 receives the voltage modification control signal from the I/O controller 150 which indicates the amount of CPU core voltage, which is transferred to the processor die 112 by the programmable regulator 172 through power line 173, is reduced. The switching regulator 171, however, is unaffected by the voltage modification control signal and continues to provide power (3.3 V, 5 V, 12 V, etc.) to power planes of the computer system 100.

Thus, in order to optimally diminish power consumption by the CPU 110 without a proportionate sacrifice of its speed, the CPU 110 first experiences frequency reduction and then voltage reduction. This order of scaling guarantees that the CPU 110 does not experience failure. Conversely, dethrottling the CPU 110 (i.e., increasing its voltage and frequency) requires the CPU core voltage to be appropriately increased before the operating frequency is increased.

The second condition, i.e., the CPU is experiencing excessive "idle" time, typically occurs when the computer system 100 is running a software application that does not require optimal performance of the CPU 110 such as, for example, various legacy software applications, word processing programs, etc. Thus, power consumption can be optimally reduced by monitoring the amount of idle time experienced by the CPU 110.

Figure 4:
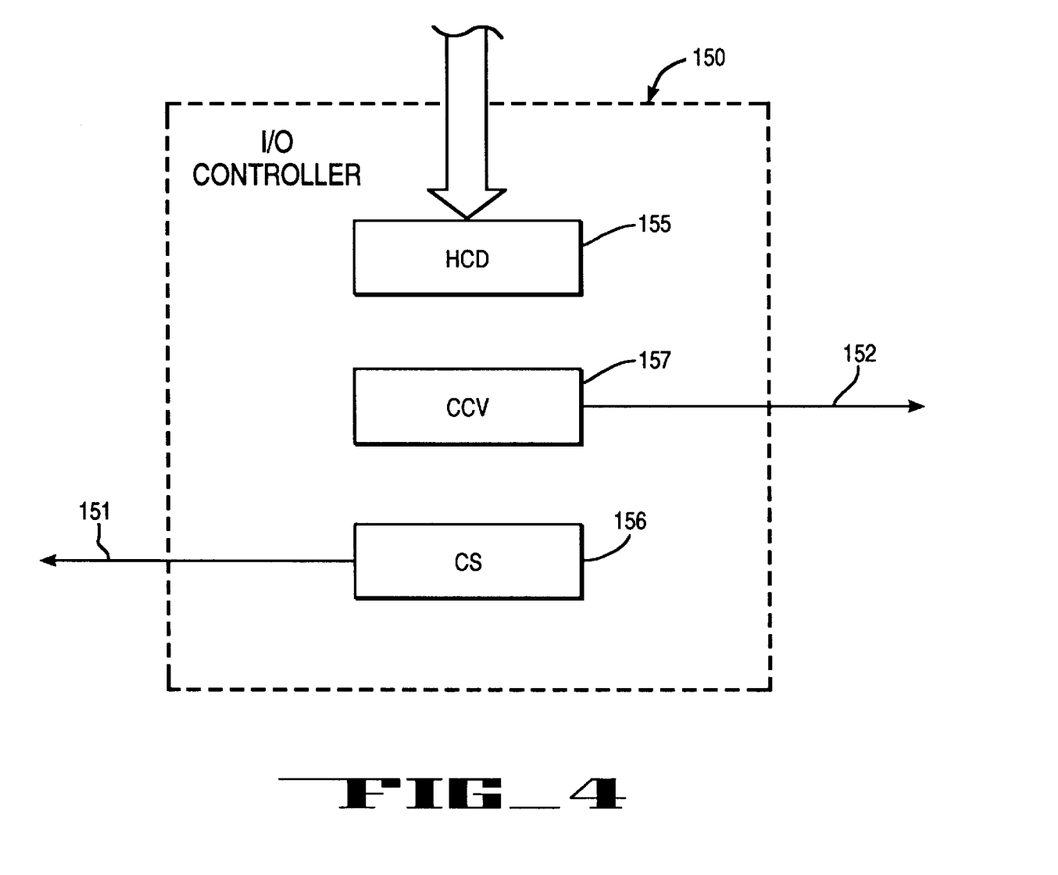
FIG. 4 is an illustrative block diagram of a plurality of registers employed within the I/O controller shown in FIG. 3.

It is well known in the art that power management software such as Advanced Power Management ("APM") software, which is stored within the main memory of the computer system and operates transparently to the user, monitors whether the CPU 110 is idle or is performing useful computations. When the CPU 110 is idle, the power management software in one implementation generates a HALT instruction and causes the CPU 110 to produce a halt acknowledgment cycle. The halt acknowledgment cycle is propagated through the system controller 120 onto the system bus 130. Upon detecting that the CPU 110 is producing the halt acknowledgment cycle, the I/O controller 150 sets its halt cycle detect ("HCD") storage element 155 as shown in FIG. 4. Thereafter, the power management software periodically scans the HCD storage element. In the event that the HCD storage element is set frequently (e.g., 5%–10% of its run time) the computer system is throttled to perform voltage and frequency scaling. In such case, the I/O controller 150 performs the voltage and frequency scaling operations in the same manner as discussed above with respect to the first condition.

Referring now to FIG. 4, an embodiment of the I/O controller 150 is shown. The I/O controller 150 includes the HCD storage element 155, a clock speed ("CS") storage element 156 and a CPU core voltage ("CCV") storage element 157. The HCD storage element 155 is a single bit register indicating dynamically how frequently the CPU is in normal or idle state. More specifically, the HCD storage element 155 is set when the CPU is idle and is reset when the CPU is in its normal operating state. Thus, power management software requests the I/O controller 150 to perform voltage and frequency scaling when the HCD storage element 155 is frequently set and return the CPU to its maximum operating frequency and corresponding voltage when the HCD storage element 155 is frequently reset.

The CS storage element 156 is configured as a "n" bit register ("n" being an arbitrary whole number) to incorporate a frequency slewing constant which is used to throttle the frequency of the CPU. This is accomplished by transferring the frequency slewing constant from the CS storage element 156 into the register 164 of the clock generation circuit. Similarly, the CCV storage element 157 is configured to incorporate a voltage slewing constant which is used to incrementally throttle the CPU core voltage provided by the power supply circuit. The voltage stewing constant is transferred into the programmable regulator of the power supply circuit as shown in FIG. 3.

Figure 5:
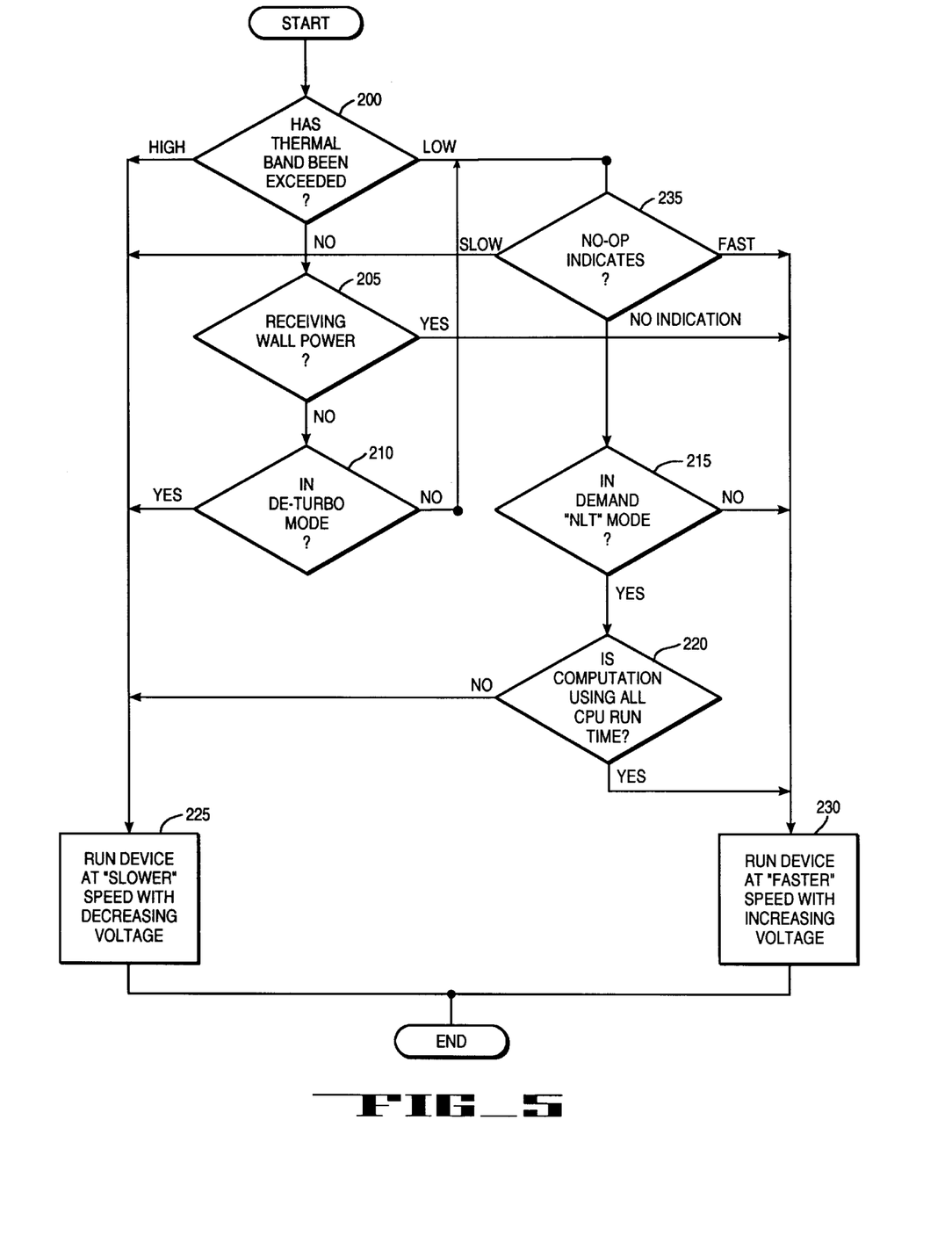
FIG. 5 illustrates the operations performed by the circuit of FIG. 3.

Referring now to FIG. 5, an illustrative flowchart featuring the operational steps of the circuit shown in FIG. 3. In Step 200, the temperature of the electronic device is monitored to ascertain whether it has exceeded the thermal band. If the predetermined thermal threshold has been exceeded, the electronic device undergoes both voltage and frequency scaling to reduce its power consumption (Step 225) or if the imposed low thermal band is exceeded, the device is capable of operating at a higher voltage and frequency subject to software control by NOP instructions (Step 235). If the electronic device has not exceeded its thermal band, a determination is made as to whether the electronic device is receiving alternating current ("AC") power from a conventional wall socket or is receiving direct current ("DC") power through a battery power supply (Step 205). If the electronic device is receiving power from the conventional wall socket, no voltage and frequency scaling is performed on the electronic device as shown in Step 230, provided the condition according to Step 200 is not met.

Alternatively, if the electronic device is receiving power from the battery power supply, a determination is required as to whether at least one of three power saving modes to reduce power consumption by the electronic device is in effect. The first power mode to be checked is whether the hardware product is in "De-turbo mode" (Step 210). In De-turbo mode, the user selectively sets (in user setup) a desired operating frequency of the electronic device to be less than the maximum operating frequency. This can be performed in laptop computers by depressing a switch located on the computer. If the hardware product employing the electronic device is in De-turbo mode, the voltage and frequency of the electronic device is appropriately scaled as configured (Step 225).

However, if that hardware product is not configured to support the De-turbo mode, a second determination is made as to whether direct software control by NOP instructions is in effect (Step 235). If software control is not in effect, a third determination id made as to whether the user has enabled a third power saving mode, referred to as a "Demand Non-Linear Throttling" ("DNLT") mode (Step 215). In this mode, if enabled by the user, software will transparently alter the voltage and frequency of the electronic device based on amount of idle time experienced by the electronic device (Step 225), provided the conditions associated with Steps 200 and 210 do not indicate the contrary. If the DNLT mode is disabled, no voltage and frequency scaling is performed. Otherwise, when DNLT mode is enabled and the electronic device is frequently experiencing idle time thereby indicating that the device is not being utilized to its full capability, voltage and frequency scaling is performed on the electronic device until it is operating at its maximum capability (Steps 220, 225). In the event that the DNLT mode is enabled and the electronic device is operating at its full capability, no voltage and frequency scaling is performed on the electronic device (Steps 220, 230). This process is continued to monitor the electronic device to optimize its performance and especially reduce its power consumption.

Figure 6:
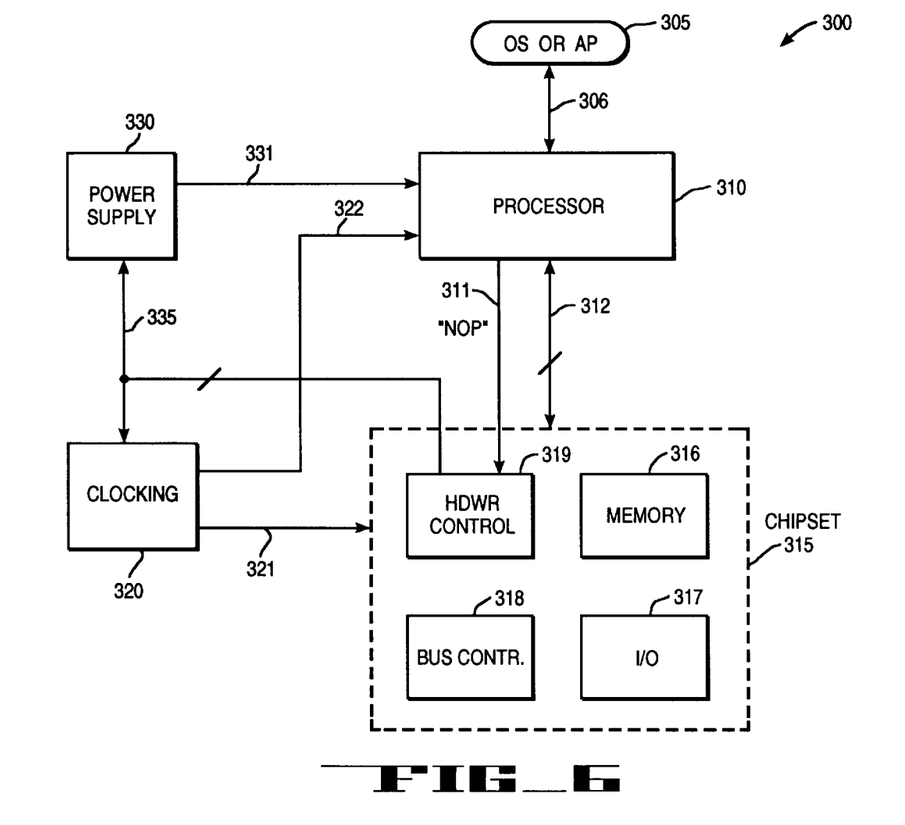
FIG. 6 is a block diagram of one embodiment of the system of the present invention.

FIG. 6 illustrates a block diagram of the power reduction system of the present invention. System 300 may be incorporated into a variety of mobile electronic devices, but is particularly well-suited for use in portable computer systems—such as laptop or notebook computers—where conservation of battery power is an important design consideration.

A persistent problem in mobile electronic devices has been the inability of a device's central processing unit (CPU) to differentiate between program instructions that should to be executed at full speed, and others that could be executed at a slower speed without adversely affecting overall system performance. For example, many operating system (OS) or application programs contain "idle" loops. An idle loop typically consists of code that the program cycles through while waiting for the occurrence of some external system event or interrupt. Such program loops present one of the worst cases for system power dissipation. As discussed below, the present invention overcomes the shortcomings and achieves precise power regulation by the use of special NOP instructions.

Referring to FIG. 6, an operating system or applications program is represented by ellipse 305 and arrow 306 for running on processor 310. System 300 also includes a power supply 330 and signal generator 320. Power supply 330 provides a supply or operating potential for the electronic device via line 331, which, by way of example, is shown coupled to processor 310. This is a typical configuration in a portable computer system.

System 300 also includes a signal generator 320 which provides clocking for both processor 310 and other system components such as a chipset 315. The processor clock signal is shown in FIG. 6 being provided to processor 310 along line 322, whereas the system clock is shown being provided to chipset 315 on line 321. Chipset 315 may include a variety of conventional system components such as memory 316, input/output (I/O) devices 317, bus controller 318, etc. System components within the chipset 315 communicate information to and from processor 310 along bus 312.

It will be appreciated by ordinary practitioners in the art that a great variety of different system configurations are possible for a mobile electronics device. Therefore FIG. 6 should not be construed as limiting the invention to any particular embodiment or mobile electronic device configuration.

The present invention improves power control by the use of special NOP instructions. These instructions are true no-operation instructions; that is, execution of the instruction does not change the architectural state (i.e., register files) of the processor. Instead, the NOP instruction includes a reserved field of bits that provide information to hardware control unit 319. Transfer of this information from processor 310 to control hardware unit 319 is conceptually depicted by line 311 in FIG. 6 . Of course, this bit field information may be transferred in different ways such as over bus 312. Alternatively, the hardware control logic 319 may also be incorporated on the same integrated circuit as processor 310.

In response to the bit pattern provided by the NOP instruction, the control logic 319 generates one or more control signals for adjusting the operating potential and frequency of the clocking signals provided by supply 330 and signal generator 320, respectively. In FIG. 6, these control signals are shown being provided to power supply 330 and clocking signal generator 320 along lines 335. Although FIG. 6 shows a single set of lines (e.g., a bus) commonly coupled from control unit 319 to units 330 and 320, it is appreciated that separate, dedicated lines may alternatively be used. That is, a variety of connections and control signals are within the scope of the invention depending upon the level of control desired. Both the power supply 330 and the clocking signal generator 320 are responsive to the control signals to either increase or decrease the operating potential and clock frequency provided at their respective outputs.

To better appreciate the operation of the system of FIG. 6, consider the following example. Assume that an operating system (i.e., DOS) is running on processor 310 and includes an idle loop. In accordance with the invention, a first special NOP instruction may be inserted by the compiler at the point in the program prior to execution of the DOS idle loop. For example, the NOP instruction may comprise a previously invalid instruction in the processor's instruction set architecture (ISA). The decode logic of the processor, however, may be modified such that the previously invalid instruction is now recognized as valid although it has no effect on the machine from an architectural standpoint. Rather, the reserved bits of the instruction inform control logic to generate appropriate control signals for the power supply and clocking signal generator to effect an increase or decrease in power.

Continuing with our example, the first special NOP instruction would produce a response by the control logic such that the operating potential and clocking frequency rate are reduced, such that power is conserved during the execution of the DOS idle loop. A second special NOP instruction may also be inserted into the code by the compiler so that when the program exits from the DOS idle loop (e.g., upon the occurrence of a system interrupt) the logic is instructed to once again increase power and clocking frequency so that instructions may once again be executed at full speed.

Speaking metaphorically, the NOP instructions provide "hints" or advice to the processor telling the processor to execute the following instructions at a slower rate. The processor can then save power by slowing the processor clock and reducing the rate at which instructions are either decoded or retired or otherwise processed.

As explained previously, the processor's operating potential may also be reduced in accordance with the present invention. If the processor were designed to ignore the hint, it could do so without causing any operational problem; though, of course, it would still accept the "hint NOP" as a valid instruction.

Figure 7:
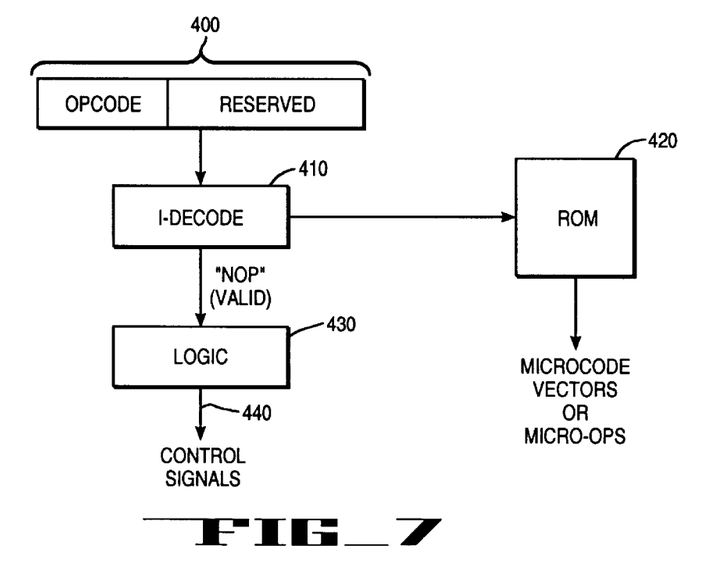
FIG. 7 illustrates the use of no-operation (NOP) instructions to invoke power control signals in accordance with the present invention.

FIG. 7 illustrates in general block diagram form how a NOP instruction is processed within processor 310 in accordance with the present invention. NOP instruction 400 includes an opcode and a reserved field that is decoded by an instruction decoder 410. For most instructions in the ISA, decoder 410 signals read-only memory (ROM) 420 to generate appropriate microcode for implementing the instruction. An invalid or obsolete opcode would simple by ignored by decoder 410 in a conventional processor.

However, in accordance with one embodiment of the present invention, the machine is modified so that these opcodes may be used as NOP instructions, i.e., valid instructions, but ones which have no affect on the state of the machine. Instead, the reserved field of NOP instruction 400 provides information to control logic 430 to generate appropriate control signals 440 for either increasing or decreasing the power of the mobile electronic device.

Practitioners in the art will appreciate the flexibility and precision that the invention provides. For instance, power may be throttled to the device in gradual increments. This means that a first set of NOP instructions may be utilized to incrementally decrease power so as to tailor the power requirements to the particular code sequence being executed. Another set of NOP instructions could provide hints to increase power at appropriate times depending upon the performance level required. Thus, invoking power control management becomes a straight forward process. The invention also obviates the need for special detection software or thermal sensors.

I claim:

1. A system for regulating power comprising:
 a power supply for providing an operating potential coupled to a processor, the power supply having an adjustable operating potential adjusted in response to a first control signal;
 a signal generator for providing a clock signal coupled to the processor, the clock signal having an adjustable frequency that is adjusted in response to a second control signal; and
 a control circuit for responding to bits associated with a set of no-operation (NOP) instructions, execution of a first NOP instruction causing the control circuit to generate the first control signal and the second control signal.

2. The system of claim 1 wherein execution of a second NOP instruction causes the control circuit to generate the first and second control signals having third and fourth values, which effectively increase the operating potential and the frequency of the power supply and signal generator, respectively.

3. The system of claim 1 wherein the first and second control signals are the same.

4. The system of claim 1 wherein the software program comprises an operating system program.

5. The system of claim 1 wherein the software program comprises an application program.

6. The system of claim 1 wherein the mobile electronic device comprises a laptop computer.

7. The system of claim 1 further comprising one or more integrated circuits (ICs) coupled to the processor, signal generator and power supply, wherein power dissipation of said one or more ICs is regulated by the first and second control signals.

8. The system of claim 1, wherein the NOP instruction controls a rate at which the processor operates, such that the operating potential generated by the power supply and the frequency of the clock signal are reduced for code sequences that may be executed more slowly without affecting an overall system performance.

9. The system of claim 1, wherein the second control signal, to control the frequency of the signal generator is generated prior to the generation of the second control signal, to control the operating potential of the power supply, in order to reduce the frequency prior to reducing the operating potential coupled to the processor.

10. The system of claim 1, further comprising:
 a compiler for compiling a software program, the compiler further for inserting the NOP instruction prior to an idle loop included within the software program.

11. A method of regulating power comprising the steps of:
 executing a first NOP instruction, the first NOP instruction causing a first set of control signals to be generated;
 (c) reducing an operating potential generated by a power supply in response to the first set of control signals; and
 (d) reducing a frequency of a clock signal generated by a signal generator in response to the first set of control signals.

12. The method of claim 11 further comprising the steps of:
 (e) executing a second NOP instruction in the software program to cause the logic circuit to output a second set of control signals;
 (f) increasing the operating potential generated by the power supply in response to the second set of control signals produced by the logic circuit;

(g) increasing the frequency of the clock signal generated by the signal generator in response to the second set of control signals produced by the logic circuit.

13. The method of claim 12, further comprising:

recognizing an idle loop in a software program during compilation; and inserting the first NOP instruction into the software program prior to the idle loop.

14. The method of claim 13, further comprising inserting the second NOP instruction into the software program after the idle loop.

15. The method of claim 11 wherein the clock signal and operating potential are coupled to the processor.

16. The method of claim 11, wherein the method is implemented on a laptop computer.

17. The method of claim 11 wherein said step of executing a first NOP instruction does not alter an architectural state of the processor.

18. The method of claim 11 wherein said step of executing a first NOP instruction causes a logic circuit coupled to the processor to output the first set of control signals.

19. The method of claim 11 further comprising: inserting at least one NOP instruction into a software program.

20. The method of claim 11 wherein the NOP instruction controls a rate at which the processor operates, such that the operating potential generated by the power supply and the frequency of the clock signal are reduced for code sequences that may be executed more slowly without affecting an overall system performance.

* * * * *